(No Model.)  7 Sheets—Sheet 1.

A. B. HAYDEN.
CASH REGISTER AND INDICATOR.

No. 460,263. Patented Sept. 29, 1891.

Witnesses
R. A. Balderson
Alfred Toll

Inventor
Austin B. Hayden
By Phil. T. Dodge
his Att'y (No Model.) 7 Sheets—Sheet 2.

A. B. HAYDEN.
CASH REGISTER AND INDICATOR.

No. 460,263. Patented Sept. 29, 1891.

on line 3-3

Witnesses
R. A. Balderson
Alfred Toll

Inventor
Austin B. Hayden
By Phil T. Dodge
his Atty.

(No Model.)  7 Sheets—Sheet 3.
A. B. HAYDEN.
CASH REGISTER AND INDICATOR.
No. 460,263. Patented Sept. 29, 1891.
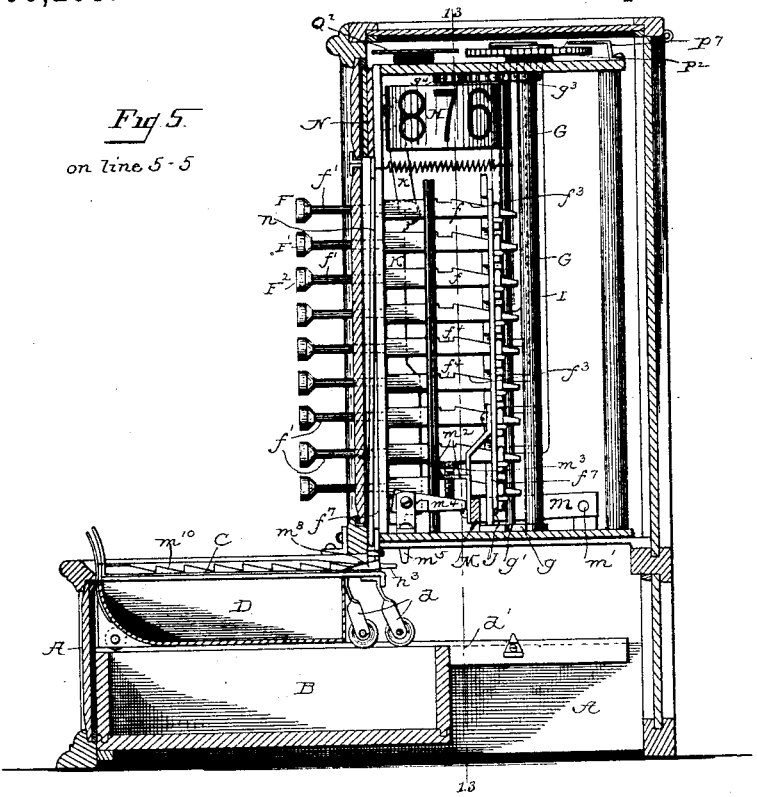
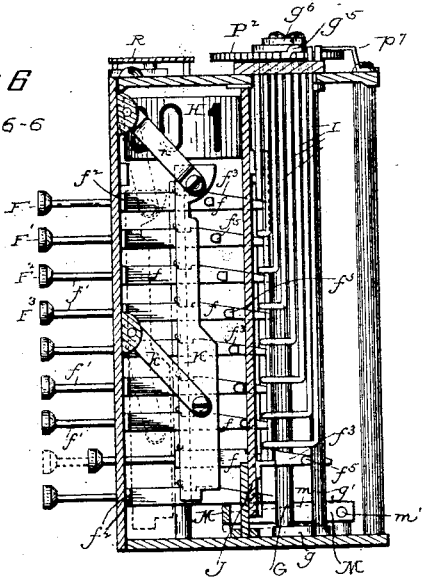
Witnesses
R. A. Balderson
Alfred Toll
Inventor
Austin B. Hayden
By Phil T. Dodge
his Atty (No Model.) 7 Sheets—Sheet 4.
A. B. HAYDEN.
CASH REGISTER AND INDICATOR.

No. 460,263. Patented Sept. 29, 1891.

on line 8-8

Witnesses
R. A. Balderson
Alfred Toll

Inventor
Austin B. Hayden
By Phil. T. Dodge
his Atty

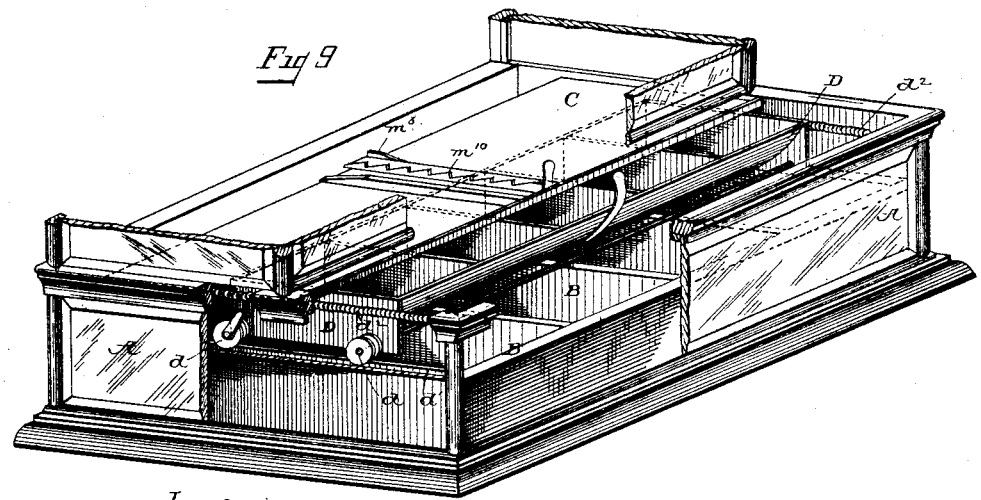
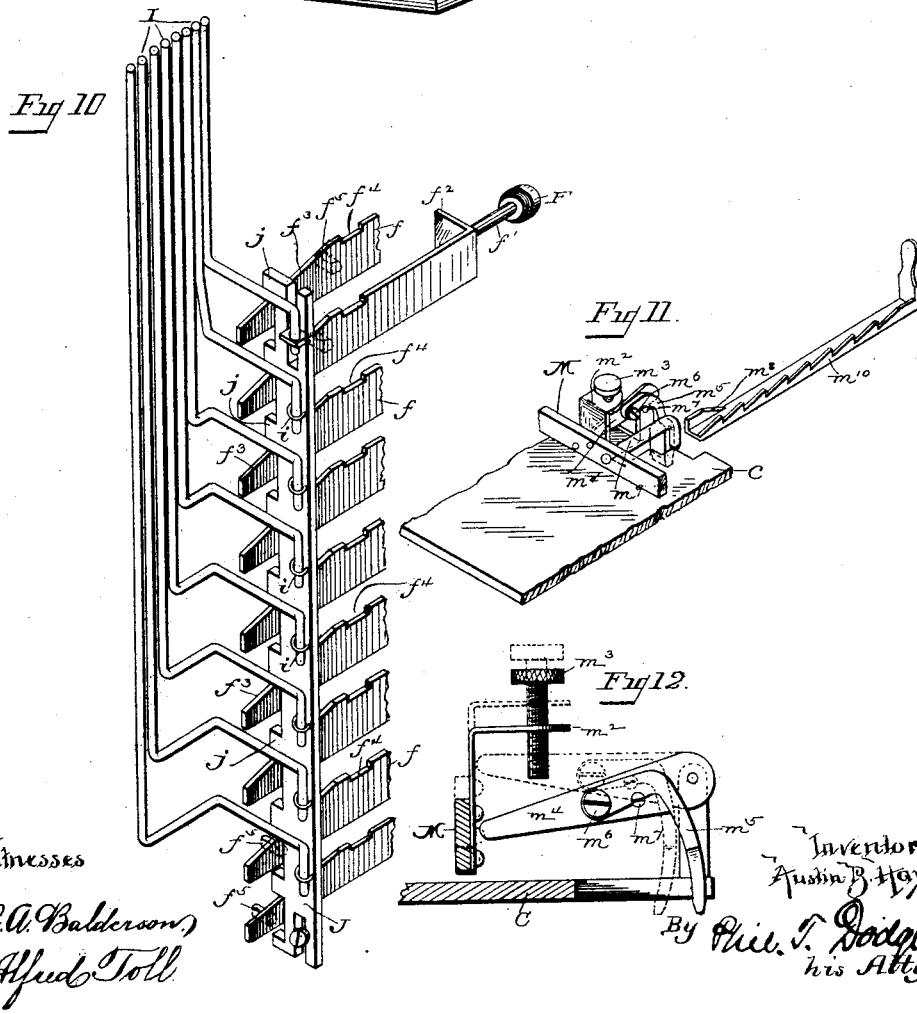

(No Model.)  7 Sheets—Sheet 6.
A. B. HAYDEN.
CASH REGISTER AND INDICATOR.
No. 460,263. Patented Sept. 29, 1891.
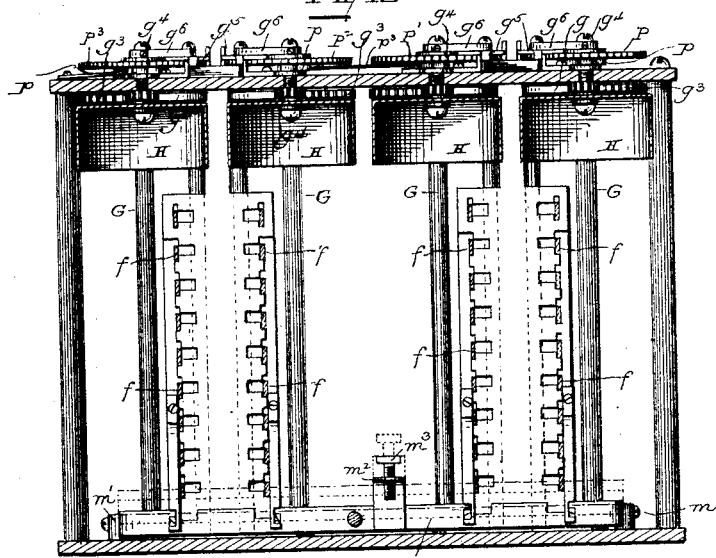
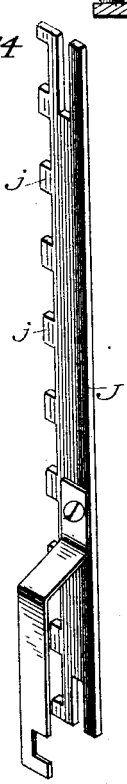
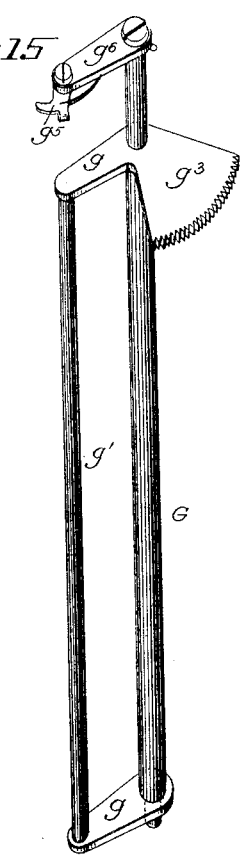
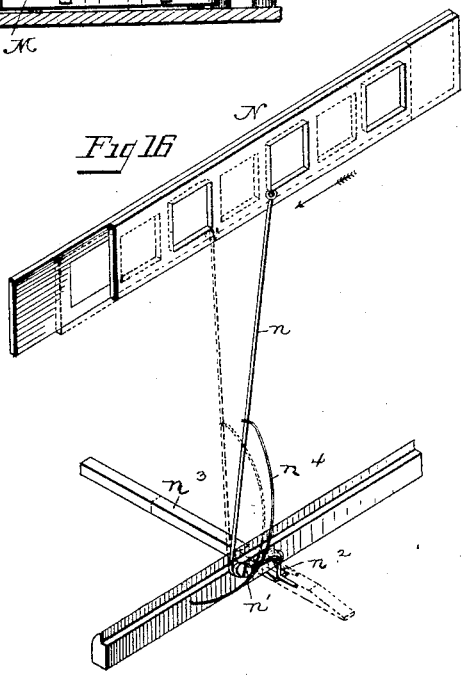
Witnesses
R. A. Balderson
Alfred Toll
Inventor
Austin B. Hayden
By Phil. T. Dodge
his Atty (No Model.) 7 Sheets—Sheet 7.
A. B. HAYDEN.
CASH REGISTER AND INDICATOR.

No. 460,263. Patented Sept. 29, 1891.

Witnesses
R. A. Balderson
Alfred Toll

Inventor
Austin B. Hayden
By Phil. T. Dodge.
his Atty

UNITED STATES PATENT OFFICE.

AUSTIN B. HAYDEN, OF KANSAS CITY, MISSOURI, ASSIGNOR TO THE HAYDEN ARTICULATING CASH REGISTER COMPANY, OF SAME PLACE.

CASH REGISTER AND INDICATOR.

SPECIFICATION forming part of Letters Patent No. 460,263, dated September 29, 1891.

Application filed June 26, 1890. Serial No. 356,825. (No model.)

*To all whom it may concern:*

Be it known that I, AUSTIN B. HAYDEN, of Kansas City, in the county of Jackson and State of Missouri, have invented certain Improvements in Cash-Registers, of which the following is a specification.

The object of my invention is to combine with a till a cash-register having a much greater capacity than those now in use.

Figure 1:
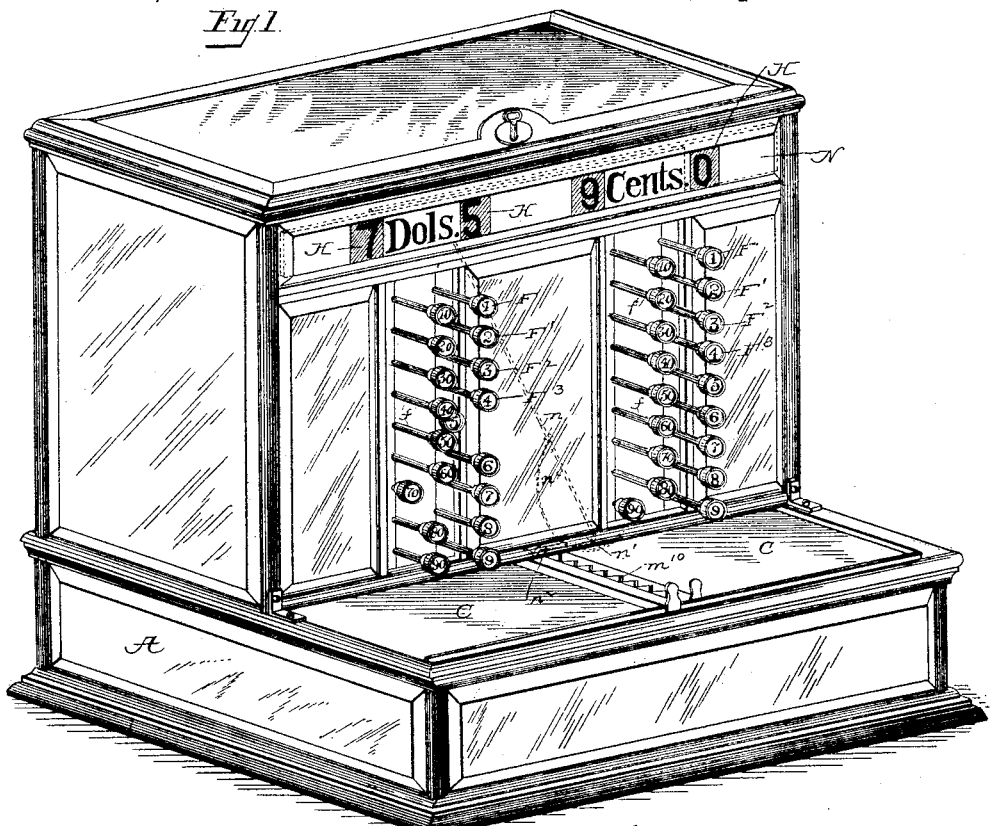
Figure 2:
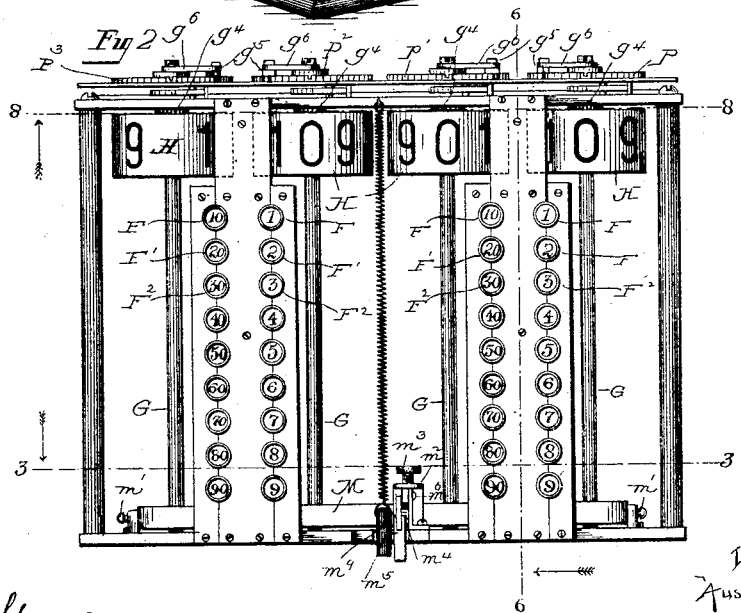
Figure 3:
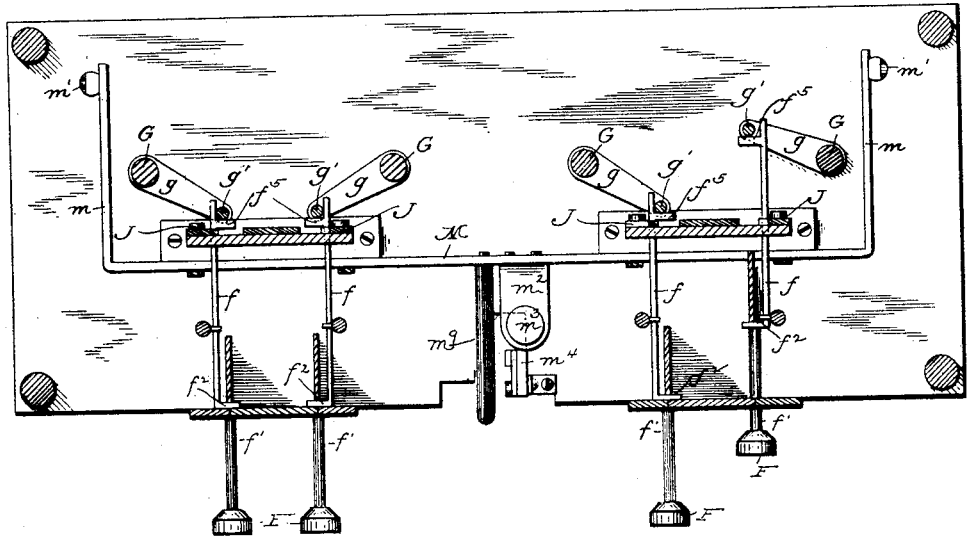
Figure 4:
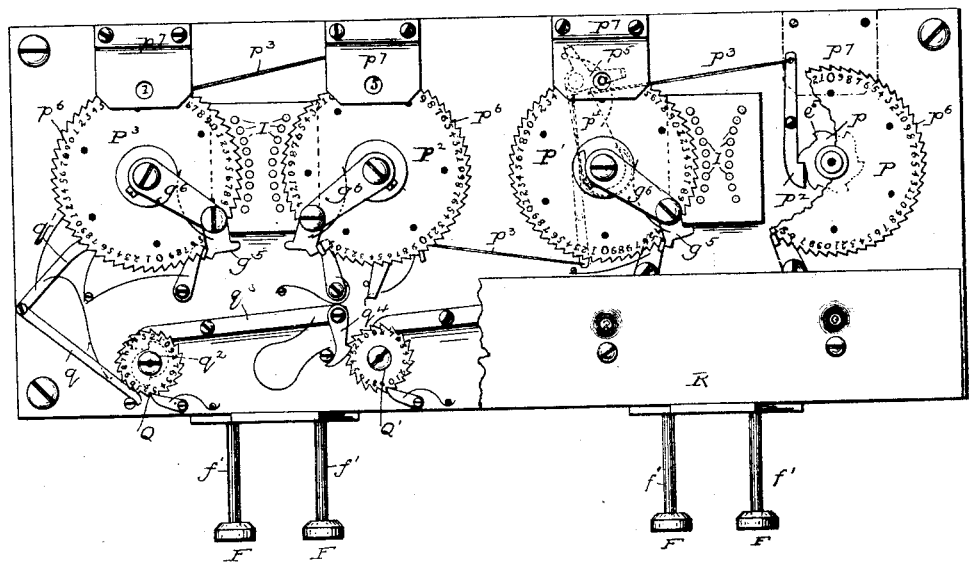
Figure 7:
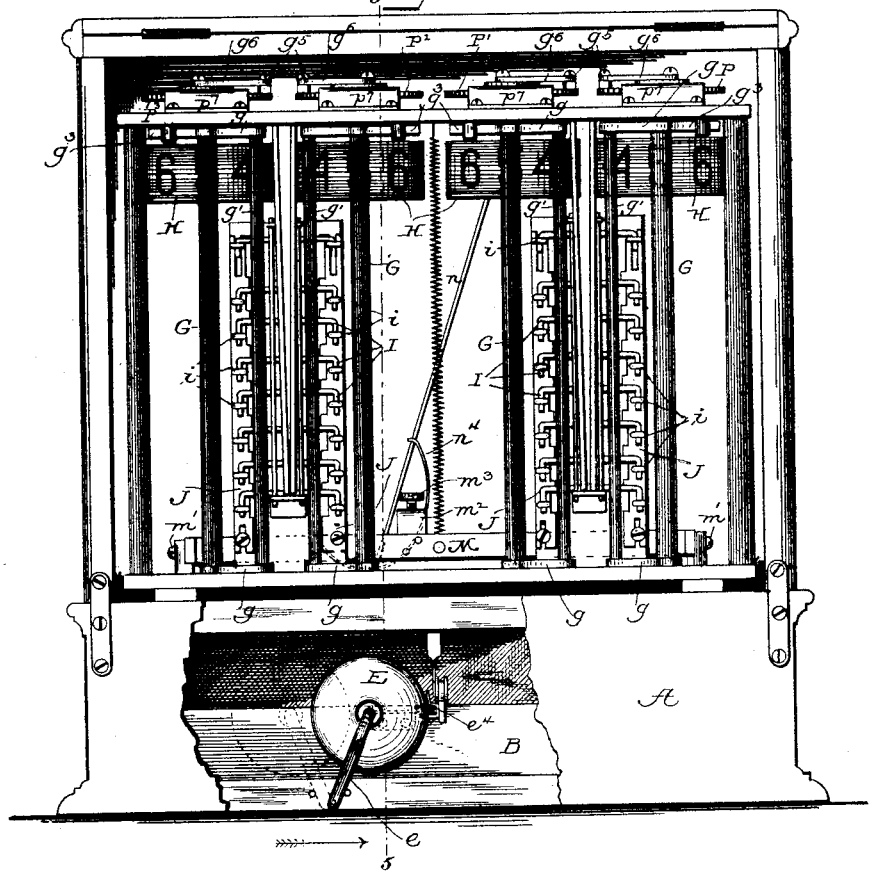
Figure 8:
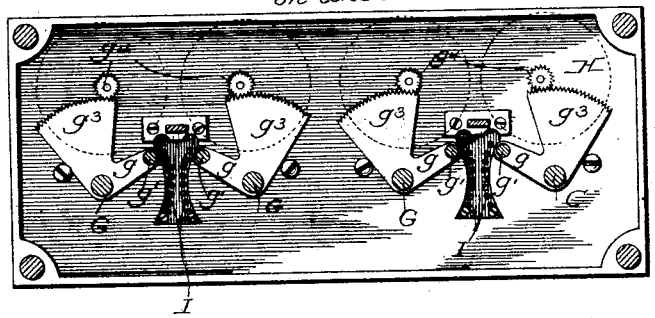
Figure 17:
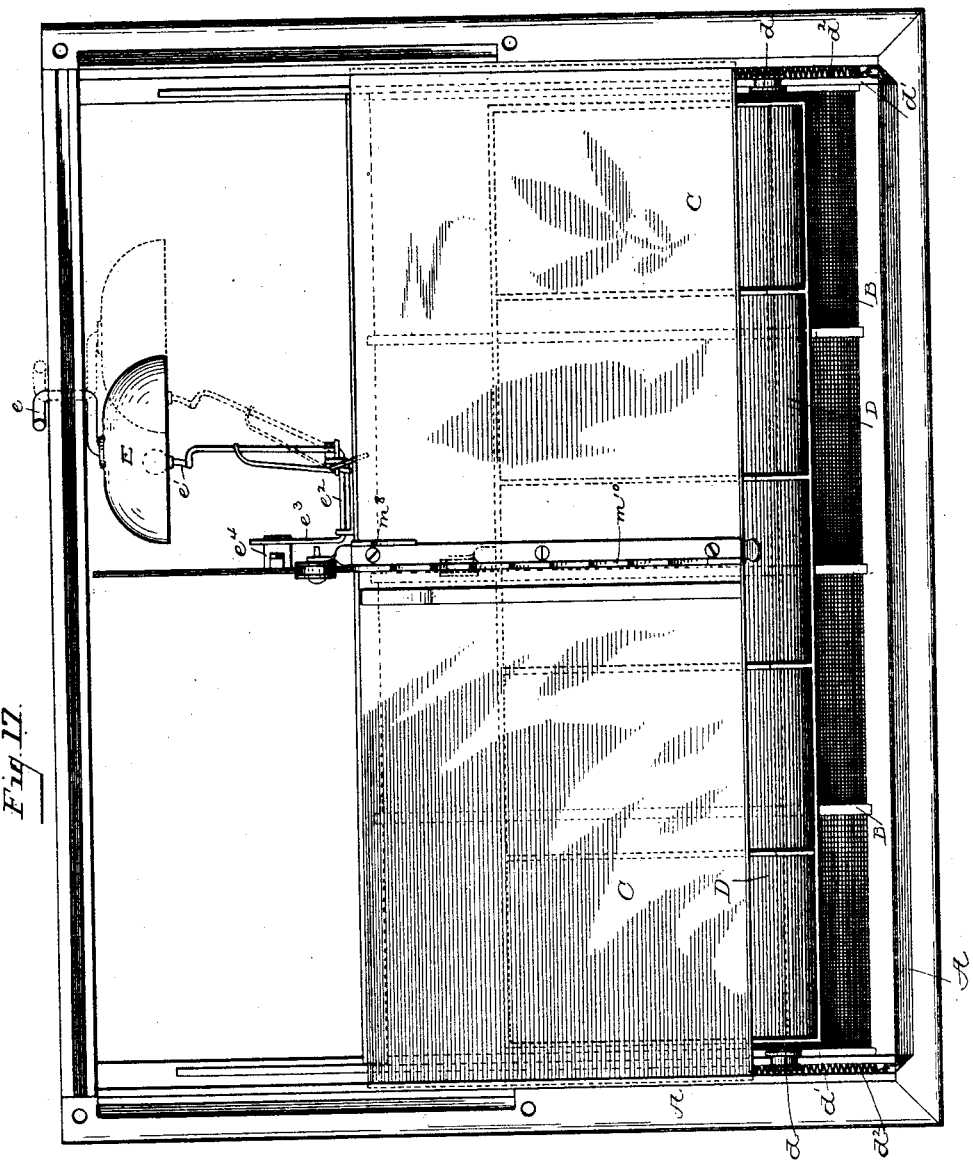
Figure 18:
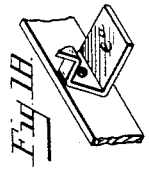

In the accompanying drawings, Figure 1 is a perspective view of my register complete with the parts in their normal positions. Fig. 2 is a front elevation of the entire registering mechanism removed from its case. Fig. 3 is a cross-section on the line 3 3 of Fig. 2, looking downward. Fig. 4 is a plan view of the registering mechanism removed from the case, illustrating particularly the indicating devices and the manner of reading amounts registered and added together. Fig. 5 is a vertical cross-section through the apparatus from front to rear on the line 5 5, Fig. 7. Fig. 6 is a vertical cross-section on the line 6 6 of Fig. 2. Fig. 7 is a rear view of the apparatus, with the back of the case removed and a portion of the till broken away to expose other parts to view. Fig. 8 is a horizontal section on the line 8 8 of Fig. 2, showing more particularly the devices for turning the indicating-drums. Fig. 9 is a perspective view showing the base of the apparatus with the till, till-cover, &c. Fig. 10 is a perspective view showing the tiers of finger-keys, the plates for locking them temporarily in position, and the stop-pins actuated both to stop the indicating devices at the proper point and prevent the same from racing or running ahead by reason of their momentum. Fig. 11 is a perspective view showing the devices which act immediately in connection with the till-cover to lock the same and to release the finger-keys. Fig. 12 is a sectional elevation showing the device through which the till-cover acts to release the finger-keys and restore the indicating devices to their normal positions. Fig. 13 is a vertical section through the registering mechanism from right to left on the line 13 13 of Fig. 5. Fig. 14 is a view of one of the plates for temporarily locking the finger-keys of one tier when pushed inward. Fig. 15 is a view in perspective of the rock-shaft and connections through which one tier of keys acts to operate the corresponding indicating-drum. Fig. 16 is a perspective view showing the device for concealing the indicating devices until the till is closed. Fig. 17 is a top plan view of the base portion of the apparatus, showing more particularly the till, till-cover, and alarm-bell. Fig. 18 is a perspective view of a detail.

My apparatus comprises, first, a till, a sliding cover therefor, and, if desired, a secondary sliding till beneath the same cover; second, an indicating mechanism controlled by finger-keys for the purpose of indicating the amount of the purchases; third, connections through which the actions of the till-cover and the indicating devices are made interdependent.

In order that the structure may be the more easily understood, I will describe the parts in the order above named.

Referring to the drawings, A represents a stationary base, which may be of any suitable form adapted to contain the till and to give support to a superstructure, in which the indicating and registering mechanism is mounted.

B is a stationary till mounted in the base, and C a cover arranged to slide forward and backward for the purpose of exposing or closing the till, as required.

D is a secondary till arranged to slide forward and backward in the main till in such manner as to be closed by the cover C. The sliding till and the cover may be mounted in guides of any suitable character which will admit of their being easily moved; but I prefer to sustain them at the sides and at the rear end by wheels $d$, attached thereto and arranged to travel upon suitable guide-rails $d'$. In order to close the till-cover automatically whenever it is released, I connect therewith springs $d^2$, which may be replaced, however, by springs of any other form and arrangement adapted to perform the same office.

In the rear part of the base-frame is mounted a bell E, sustained by a crank-shaft $e$, projecting through the case to the exterior, so that the bell may be thrown at will from the operative position shown in full lines in Figs. 7 and 17 to the inoperative position shown in dotted lines. In order to sound this bell whenever the till-cover is opened or closed, I provide a striker $e'$, carried by a rock-shaft $e^2$, having an arm $e^3$, acted upon by a pivoted rocking plate $e^4$, (separately shown in Fig. 18,) in the path of the guide-roller attached to the back of the till-cover. As the cover is moved the roller rides over and rocks the plate $e^4$, which, through the intermediate parts, causes the sounding of the bell. The foregoing parts constitute the entire till mechanism.

Passing now to the indicating mechanism, F F' F², &c., represent finger-keys arranged in four vertical rows or ranks representing, respectively, the different numbers or values which will be indicated and registered by operating them. Each tier of keys operates upon its own indicating-drums. As each tier of keys and all its connections are the same as those in each of the other tiers, a description of one tier will answer for all. Each of the keys consists, as shown in Figs. 5, 6, and 10, of a horizontal slide or plate $f$, having at the front end a guiding and sustaining neck $f''$, with a finger-key thereon, and a laterally-projecting shoulder $f^2$, and having at the rear end an inclined surface $f^3$, a notch $f^4$, and a laterally-projecting stud $f^5$. Each key is mounted to slide freely forward and backward on vertical frame-plates $f^7$. Near the inner ends of the keys there is mounted a vertical rock-shaft G, having at the top and bottom crank-arms $g$, carrying a vertical rod $g'$, Fig. 15. This rod $g'$ lies behind the lateral studs $f^5$ of the keys, so that whenever a key is pushed inward its stud, acting on the rod $g'$, causes a partial rotation of the shaft G. The shaft G carries at its upper end a sector-pinion $g^3$, which engages a pinion $g^4$, fixed to a vertical drum or cylinder H, the outer surface of which is provided with numerals from 1 to 10, exposed one at a time through an opening in the front of the case, as shown in Figs. 1 and 5. When, therefore, any key in the tier is pushed inward, its stud $f^5$ acts to turn the shaft G, which, through its pinion $g^3$, rotates the drum so as to bring into view the number or amount represented by the finger-key. A spring $g^{15}$ is extended, as shown in Fig. 5, from each of the crank-rods $g'$ to the frame, so that it resists the action of the keys and returns the rock-shaft and indicator-drum to their original positions, when the finger-key is allowed to slide forward again. In order that the respective keys may turn the drum to different positions, so as to expose the appropriate numbers, the studs $f^5$ are located on the respective keys at different distances from their inner ends. The several keys act, therefore, to turn the shaft G and the indicator-drum different distances. When the keys are pushed suddenly inward, the indicator-drum receives a high velocity and acquires a momentum which tends to carry it beyond the proper point. To prevent this action, I connect with each key a stop device to arrest the drum at the proper point. These stop devices consist, as shown in Fig. 10, of a series of vertical sliding wires I, projecting upward through the top of the frame in position to encounter the dog $g^5$, carried, as shown in Fig. 15, on the end of an arm $g^6$, fixed rigidly to the top of the rock-shaft G. The lower ends of these stop-wires are bent into angular forms and guided in eyes $i$, so that they may rise and fall freely. Each wire is carried over the inclined surface $f^3$ of one of the finger-keys. When, therefore, a key is pressed inward to operate the indicating-drum, its surface $f^3$ lifts the appropriate stop-wire into the path of the dog $g^5$, so that when the drum is turned sufficiently to expose the number represented by the key the dog will encounter the stop-pin and further motion of the parts will be prevented.

It will of course be understood that each pin stops the drum in a position appropriate to the particular key by which it is at the moment actuated.

For purposes which will hereinafter appear it is desirable to lock the keys in position when they are pressed inward to indicate the amount of the purchase and to hold them in this position until the till-cover is again closed. For this purpose I mount near the inner ends of the keys a vertical gravitating-bar J, having lateral ears $j$, riding on the inclined edges $f^3$ of the keys, so that whenever a key is pressed inward until its notch $f^4$ is in line with the bar J the bar will fall and its ear $j$ will enter the notch and hold the key in position, as shown near the bottom of Fig. 6.

For the purpose of pushing the keys outward and restoring them to their original positions after they are released I mount at the side of the tier a heavy vertical bar K, guided at its upper end by links $k$, pivoted to the front of the frame. (See Figs. 5 and 6.) This bar rests normally against the inside of the shoulder $f^2$ of all the keys, and when a key is pushed inward it causes the bar to swing inward and upward, as shown in Fig. 6. When the key is released, the gravitating-bar, guided by the links, swings forward and pushes the key before it. By this simple device I am enabled to dispense with the employment of the usual restoring-spring and to avoid the many troubles attending its use.

In order that the opening of the till-cover may release the indicating drums and keys and restore them to their normal positions and that, on the other hand, the till-cover may be locked open until the amount has been properly registered, I make provision as follows: The four vertical bars J which lock keys are all connected at their lower ends by sliding joints to a horizontal bail or bar M, sustained by backwardly-turned arms $m$, mounted on horizontal pivots $m'$. This gravitating bar or bail is provided, as shown in Figs. 3 and 12, with an arm $m^2$, carrying a vertical screw $m^3$, lying above a finger $m^4$, pivoted to a stationary part of the frame. This finger $m^4$ carries on its side a trip-finger $m^5$, pivoted thereto at $m^6$ and acting against a stop-pin $m^7$ thereon. The till-cover is provided at its rear edge with a rigid shoulder $m^8$, which stands, when the cover is closed, forward of the trip-finger $m^5$.

The parts operate as follows: Assume that a series of finger-keys have been pushed inward to effect the registration, that they are held inward by the locking-bars J, and that the till-cover is closed. If now the till-cover be opened by sliding it backward, its shoulder $m^8$ will act on the trip-finger $m^5$, causing it to lift the finger $m^4$, which in turn acts against the screw $m^3$, lifting the bail M, as shown by dotted lines in Fig. 12. The bail in rising lifts all the bars J, and thereby releases the finger-keys, which are pushed forward by the gravitating-bar K, before referred to. As the fingers move forward they permit the stop-pins I to descend by gravity to their original positions. In order to hold the till-cover open, the bail M is provided with a depending lip $m^9$, which engages teeth $m^{10}$, fixed on the top of the till-cover, so that as the cover completes its opening movement it is held by the lip $m^9$. While the cover is in its open position the salesman completes the making of change and thereafter manipulates the keys to effect the indication of the amount. When a key is pushed inward, it lifts the locking-bar J, which in turn lifts the bail and disengages the lip $m^9$ from the till-cover, allowing the cover to return automatically under the influence of the springs to its closed position. This leaves the indication of the amount received still in view and leaves the till-cover in a locked position, so that it cannot be again opened without restoring the indicator-drums to their normal positions and thereby indicating the fact of the opening.

Experience has shown it to be desirable to conceal the indication until the till-cover is closed. This I effect by mounting in the front of the case immediately in front of the indicating-drums a horizontal slide N, (see Figs. 5 and 16,) provided with openings, so that when these openings are brought in register with those in the case the drums will be exposed to view, but when the slide is moved out of this position it will close the openings in the case and conceal the drums. This slide is actuated by the upper end of a lever $n$, urged in one direction by spring $n^4$, and having its lower end pivoted to the case at $n'$ and provided with a lateral extension $n^2$, riding on a bar $n^3$, fixed to the till-cover and beveled at its rear end, as shown in Figs. 9, 16, 17, &c. When the till-cover is closed the lever $n$ stands in the position shown by full lines in Fig. 16, exposing the drums to view; but as the till-cover is opened the bar $n^3$, under riding the end of the lever, causes the latter to assume the position shown in dotted lines, thereby concealing the drums.

The various parts above described are provided with thirty-six keys in four tiers of nine each, representing the values indicated thereon in the drawings. This is a complete and operative apparatus adapted to indicate amounts to ninety-nine dollars and ninety-nine cents. In order, however, to adapt the apparatus for indicating still larger amounts and for adding such amounts together so that the total sales for a long period of time may be registered, I provide at the top of the apparatus a registering mechanism which I will now describe, referring particularly to Figs. 4, 5, 6, 7, and 13.

On the upper end of each of the rock-shafts G, I mount loosely registering-wheels P P', &c., these wheels and their connections being constructed in duplicate. Each wheel is provided with peripheral ratchet-teeth engaged by the dog $g^5$, before referred to as being carried by the arm $g^6$, fixed to the top of the rock-shaft. When, therefore, either of the shafts is moved by the operation of the finger-key to turn the indicating-drum, the arm $g^6$ will also be turned and its dog $g^5$ caused to advance the wheel P a corresponding distance. The wheels P may have any suitable number of teeth, according to the system of computation employed; but I commonly provide them each with sixty teeth, divided into groups of ten. To each wheel P, I affix a wheel $p$, having a tooth or projection $e^5$ for every ten teeth on the main wheel. This secondary wheel $p$ acts on one end of a pivoted lever $p^2$, which is connected by a wire $p^3$ with a swinging arm $p^4$, carrying a pivoted dog $p^5$, which engages the teeth of the next wheel P on the left. The same connections exist between the second and third wheels and between the third and fourth wheels, so that whenever any one of the wheels in the series is advanced ten teeth it acts through the intermediate devices to turn the next wheel to the left one tooth. The main wheels P P', &c., are provided in their upper faces adjacent to the respective teeth with numerals $p^6$, exposed to view one at a time through openings in overlying plates $p^7$. Owing to the connections between the wheels and the relations between their numerals they will register correctly in accordance with the decimal system.

As a still further development of the system for effecting high registrations, I mount in the top of the frame four smaller registering-wheels Q Q', &c., each having twenty ratchet-teeth on the periphery. The first of these wheels Q is actuated by a pawl $q$, moved in turn by a lever $q'$, acted upon by a stud or projection on the under side of the wheel P³. The wheel Q carries an eccentric hub or wheel $q^2$, having two teeth or projections which operate a lever $q^3$, carrying a pawl $q^4$, which in turn actuates the wheel Q'. The wheel Q is connected by like devices with wheel $q^2$, and the latter in turn with wheel $q^3$. The wheels Q Q', &c., are covered by a plate R, having openings through which the figures on the upper face of the wheel are exposed, one at a time.

The top of the case will be constructed of glass or provided with a hinged lid to admit of the registration being viewed at will.

The manner in which the successive registering-wheels are advanced intermittingly each by its predecessor will be apparent to every skilled mechanic and to those familiar with registering and calculating mechanisms, and need not, therefore, be further described herein.

Briefly considered, the operation of my apparatus as a whole is as follows: The last indication being in view, the till-cover closed, and the keys locked in the positions in which they were last placed to effect the indication, the operator pushes the till-cover open. The effect of this action is to unlock the keys and effect their restoration and the restoration of the indicating-drums to their normal positions, the drums being at the same instant concealed from sight and the till-cover locked in its open position. The operator having made use of the till, next pushes in the appropriate keys to indicate the amount of the sale, and in so doing he releases the till-cover, which immediately closes, at the same time exposing the indication on the drums to view.

Although the indication on the drum is of a temporary character the registration on the top wheels continues and is of a permanent character, the sum total of all the sales being registered thereon.

Having thus described my invention, what I claim is—

1. In a cash-register, the combination of a rock-shaft G, having a rod $g'$ parallel with its axis, an indicator-drum geared to the rock-shaft to be turned to and fro thereby, a series of sliding fingers having at respectively different points projections to act on the rod $g'$ and turn the drum to different points, and a spring to return the parts to their normal positions.

2. In a cash-register, the combination of a rotary indicator, a series of finger-keys each representing a distinctive amount, intermediate gearing, substantially as described, through which the keys act to turn the indicator to a single position, automatic means to restore the parts after action to their normal position, and an automatic locking device common to the series of keys to hold the key which is actuated and thereby the indicator in position.

3. In a cash-register, the combination of a series of sliding keys each representing a distinct amount, a rock-shaft having an arm $p'$, against which the keys operate to turn the shaft respectively different distances, a rotary indicator geared to said shaft, a spring to return the indicator to its normal position, and a locking-bar $j$, common to the series of keys, adapted to lock the key which is actuated in position, as described.

4. In a cash-register, a tier of sliding keys, in combination with the gravitating bar K, and guides to cause its lateral motion, whereby it is enabled to return either of the keys to the normal position.

5. The indicating-drum, the series of notched finger-keys, intermediate mechanism through which the keys are to turn the drum to different positions, a restoring-spring, and the gravitating locking-bar common to the keys arranged to engage and hold the key which is actuated to effect an indication.

6. In a cash-register, a rotary indicating-drum, a series of finger-keys and intermediate connections through which they turn the drum different distances, a locking device to hold the keys when advanced, and means to restore the parts when unlocked, in combination with a movable till-cover acting to disengage the key-locking device.

7. In combination with a series of finger-keys, an indicating mechanism connected therewith and operated thereby, locking devices to temporarily hold the keys when actuated, means to restore the parts when released, a movable till-cover which acts in opening to disengage said locking device, and a device connected with the registering mechanism to hold the till-cover open until the registering-keys are again actuated to effect an indication.

8. In a cash-register, the tiers of sliding finger-keys with beveled ends, and studs $f^5$, in combination with the rock-shaft G, provided with rod $g'$, pinion $g^3$, and arm $g^6$, the indicating-drum geared to said pinion, the pawl $g^7$, carried by arm $g^6$, the toothed register-wheel with which the pawl engages, and the stop-wire I, acted upon by the respective keys, whereby the drum is caused to indicate temporarily the amount of the last sale and the wheel caused to register the sum total of the sales.

9. In a cash-register, the register-actuating keys, their locking-bars, and the bail or bar M connected therewith, in combination with the dog attached to the bail to lock the till-cover, the sliding till-cover, its closing springs, and the pivoted finger through which the till-cover acts to raise the bail, whereby the opening of the cover is caused to restore the indicating devices to their normal position and the actuation of the indicating devices caused to close the cover.

10. In combination with the till-cover and the striker actuated thereby, the bell and its sustaining-crank having a projected portion through which it may be operated to carry the bell to an inactive position.

11. In a cash-register, the combination of an indicator, a shutter to conceal the indicator from view, and a till-cover connected with the shutter and operating to close the same when the till is open, and vice versa.

In testimony whereof I hereunto set my hand, this 13th day of June, 1890, in the presence of two attesting witnesses.

AUSTIN B. HAYDEN.

Witnesses:
E. C. SATTLEY,
G. H. CHURCHILL.